United States Patent [19]
Sugihara et al.

[11] 3,821,792
[45] June 28, 1974

[54] COLOUR TELEVISION RECEIVER

[76] Inventors: Yasumasa Sugihara; Mitsutaka Takayama, both of c/o The General Corporation, 1116 Suenaga, Kawasaki, Japan

[22] Filed: Dec. 6, 1971

[21] Appl. No.: 205,079

[30] Foreign Application Priority Data

Feb. 2, 1971 Japan .......... 46-3880
Feb. 23, 1971 Japan .......... 46-9199

[52] U.S. Cl. .......... 358/35
[51] Int. Cl. .......... H04n 9/12
[58] Field of Search .......... 178/5.4 R; 307/262; 328/155

[56] References Cited

UNITED STATES PATENTS

| | | | |
|---|---|---|---|
| 3,315,170 | 4/1967 | Baker | 178/5.4 R |
| 3,593,041 | 7/1971 | LaBarre | 178/5.4 R |
| 3,597,529 | 8/1971 | Hickman | 178/5.4 R |

*Primary Examiner*—Richard Murray

[57] ABSTRACT

A colour television receiver for receiving a colour television signal is characterized by the provision of a phase modulation circuit in a chrominance signal processing circuit of the receiver, said phase modulation circuit being responsive to a voltage of suitable polarity and magnitude related to the magnitude of the luminance signal for correcting differential phase distortion of the colour television signal caused by transmission lines therefor.

8 Claims, 13 Drawing Figures

INVENTOR

BY

ATTORNEY

Figure 1:
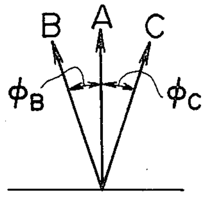

INVENTOR.

BY

INVENTOR

BY

ATTORNEY

COLOUR TELEVISION RECEIVER

There are three colour television transmission systems, namely, NTSC, PAL and SECAM systems, which find practical use at present throughout the world. In order to provide compatibility with the conventional black-and-white television transmission systems, each of these colour television transmission systems employs a technique whereby a chrominance signal containing information of two colour difference signals is superimposed on a luminance signal (Y) which contains information concerning brightness or darkness of an image. In the NTSC system, the colour signals or two colour difference signals are used to provide quadrature balanced modulation of colour subcarriers of either 3.58MHZ or 4.43MHZ for superposition with the high frequency region of the luminance signal. In the PAL system, one of the colour subcarriers which undergoes balanced modulation by R-Y component of the two colour difference signals is reversed in phase, by 180°, for every line period.

To demodulate these carrier-suppressed modulated waves, it is necessary to supply sinusoidal voltages having the same frequency as the colour subcarriers and having constant amplitude and constant phase or phases. In order to allow the generation of such sinusoidal wave within a receiver, a colour sync signal is placed in a horizontal blanking period present intermediate successive horizontal lines of a colour television signal generated and transmitted by a broadcast station. The receiver utilizes the colour sync signal received to control the frequency and phase of a local oscillator or oscillators located therein. In the PAL system, the colour sync signal has alternately varying phases of +45° and −45° from 180°-axis so as to be available as information indicative of the phase of the subcarrier used for R-Y component. It is to be noted that any such particular arrangement of the respective transmission systems does not form part of the invention.

The information transmitted to viewers and formed as a colour television signal at a broadcasting station must traverse a number of transmission lines before it is reproduced on individual picture tubes. These transmission lines are known to cause phase distortion, mostly differential phase distortion resulting from the superposition of chrominance components on the luminance signal. For demodulating the chromaticity components, the generation in the receiver of a subcarrier voltage of the same frequency and amplitude as the colour sync signal and having a fixed phase relationship therewith has been found to produce hue distortion because the television signal in travelling along the transmission line will be displaced in phase to an extent depending on whether it is superimposed with a bright or dark portion of the luminance signal. As a consequence, what is to be reproduced with the same hue in the receiver will be reproduced with different hues for bright and dark portions. This disadvantage has been pointed out as the major drawback of the NTSC system since its employment as the standard system in the United States in 1953 until now.

The PAL system has attempted to cope with the problem of differential phase distortion. This system employs a signal which is distinguished from NTSC signal in that the subcarrier modulated by R-Y component alternates in phase between 0° and 180° for every line period. The net result of this is that phase distortion caused by the transmission lines occurs in opposite directions for two immediately following horizontal lines; that is, if a phase distortion of R-Y subcarrier signal (shown at A in FIG. 1) during an m-th line occurs in a positive direction as shown at B with a phase lead of $\phi_B$, then during the next $(m+1)$-th line, the subcarrier signal C will have a phase lag of $\phi_C$, it being understood that the magnitude of the phase shifts $\phi_B$ and $\phi_C$ is substantially equal. In view of the fact that immediately adjacent horizontal lines convey very similar information, a conventional colour television receiver of PAL system incorporates a delay circuit having a time delay equal to one line period for simultaneously reproducing the signals B and C to derive an arithmetic average D (FIG. 2), thereby yielding a signal of substantially the same hue as the signal A in FIG 1.

However, this technique involves the disadvantage that the fidelity of image reproduction is lost where two immediately adjacent lines convey informations of great difference because a false image is represented at the boundary of vertically aligned hues. In addition, the technique cannot prevent the occurrence of lack of saturation as represented by ΔS in FIG. 2.

Another technique has been proposed which does not use a delay circuit, but instead utilizes the integrating function of the eye to the hues from two immediately adjacent horizontal lines as represented on the face of the picture tube to render the eye insensitive to hue distortion. However, the quality of image achieved in this manner cannot be enhanced beyond a limit.

Therefore, it is an object of the invention to provide a system for eliminating or reducing on the receiving side a differential phase distortion caused by transmission lines.

Figure 3A:
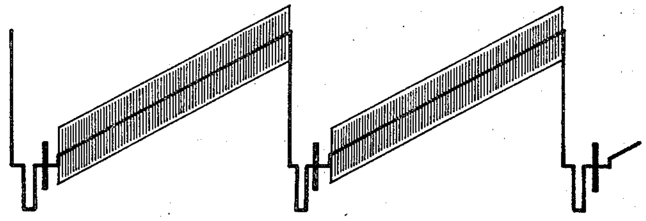
Figure 3B:
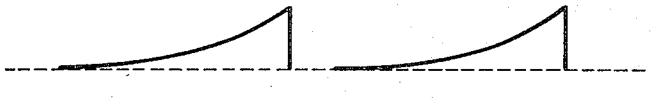

As mentioned previously, a differential phase distortion caused by transmission lines results from the superposition of the chrominance signals with the luminance signal. Since a colour sync signal which provides a reference is located on the back-porch of a horizontal sync signal which is adjacent the black level of the image, it follows that the differential phase distortion varies with the brightness or darkness of the image, distortion for a bright portion being greater in general than that for a dark portion. The variation of such distortion is not necessarily porportional to the variation in the lightness of the image, and for a signal as represented in FIG. 3A, it may be somewhat intensified for brighter portions as illustrated in FIG. 3B.

The invention resides in a colour television receiver for receiving a colour television signal comprising a superposition of chrominance signals formed by modulation of a colour subcarrier with two colour difference signals on a luminance signal containing information concerning the brightness or darkness of an image, characterized by the provision of a phase modulation circuit in a chrominance signal processing circuit of the receiver, said phase modulation circuit being responsive to a voltage of suitable polarity and magnitude related to the magnitude of the luminance signal for correcting differential phase distortion caused by transmission lines for the colour television signal.

In this manner, the invention avoids the need for a delay circuit with concomittant improvement in colour resolution in the vertical direction, and also prevents the occurrence of interference stripes such as Venetian blind. In addition, without recourse to the integrating function of the eye to average out different hues from two immediately adjacent horizontal lines on the screen of the picture tube, the invention affords the effect to maintain the hues from two such lines as near to each other as possible.

Such effects of the invention can be readily and effectively attained even in the NTSC system in which the correction on the receiver side would normally have been considered most difficult. The invention is also applicable to the SECAM system.

As a further development of the invention, the colour television receiver according to the invention may be characterized by a control circuit which is responsive to the magnitude of differential phase distortion caused by transmission lines in a phase distortion detecting signal inserted in a vertical retrace period of a colour television signal for automatically determining the amount of correction to be applied to the phase of the signal.

Such a phase distortion detecting signal may be inserted into a colour television signal on the transmitting side in the form of a colour burst located in a single line period of a vertical retrace time, the colour burst having a constant amplitude and a fixed phase, for example, of 180° and being superimposed on the black and yellow levels of the luminance signal. Any differential phase distortion occurring in the transmission lines will have different magnitudes at the black and yellow levels, depending on the characteristics of the transmission lines and the equipment through which the colour television signal traverses. The detected value of the phase distortion detecting signal may be used to control the degree of phase modulation applied for the purpose of correcting the differential phase distortion.

Figure 2:
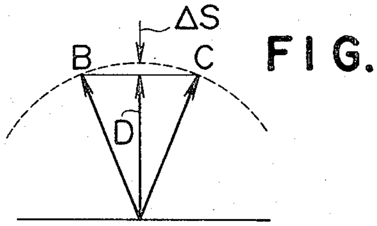
Figure 4:
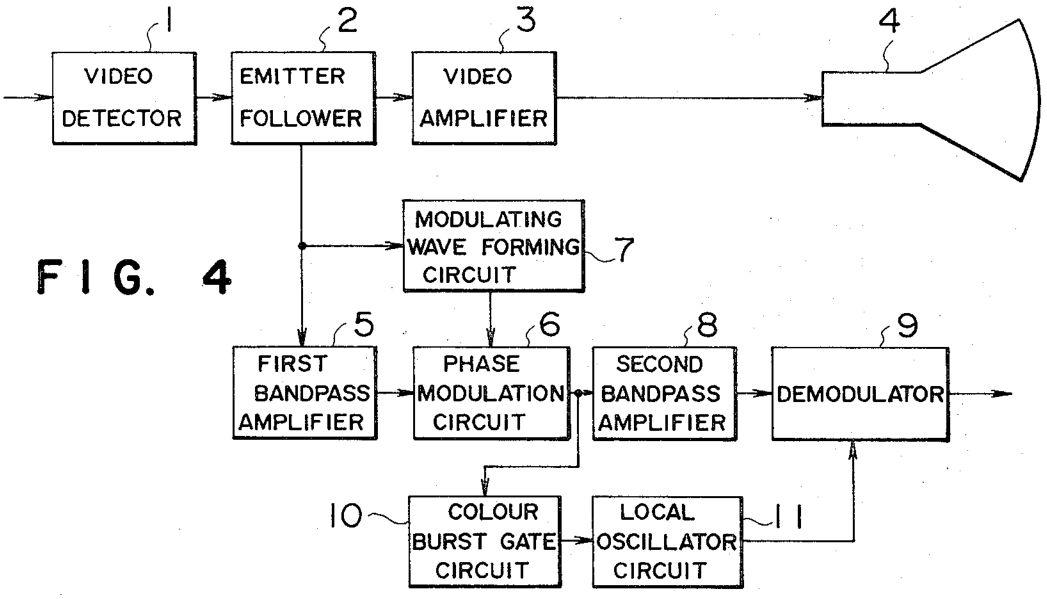
Figure 5A:
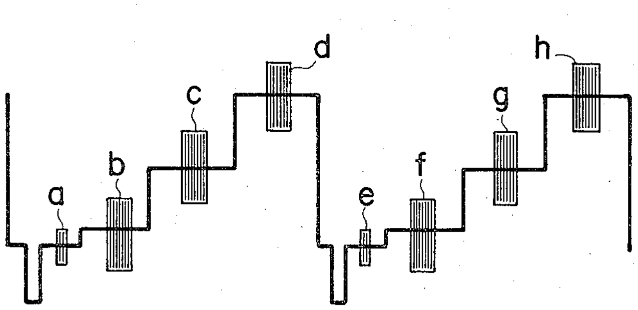
Figure 5B:
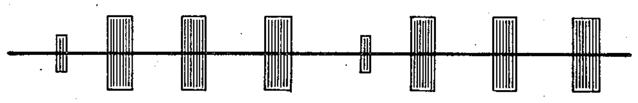
Figure 5C:
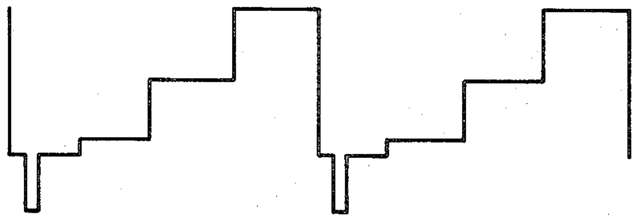
Figure 6:
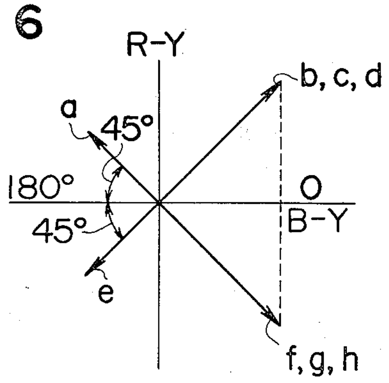
Figure 7:
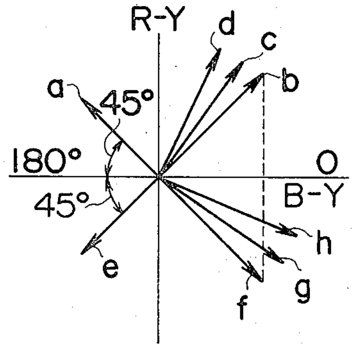
Figure 8:
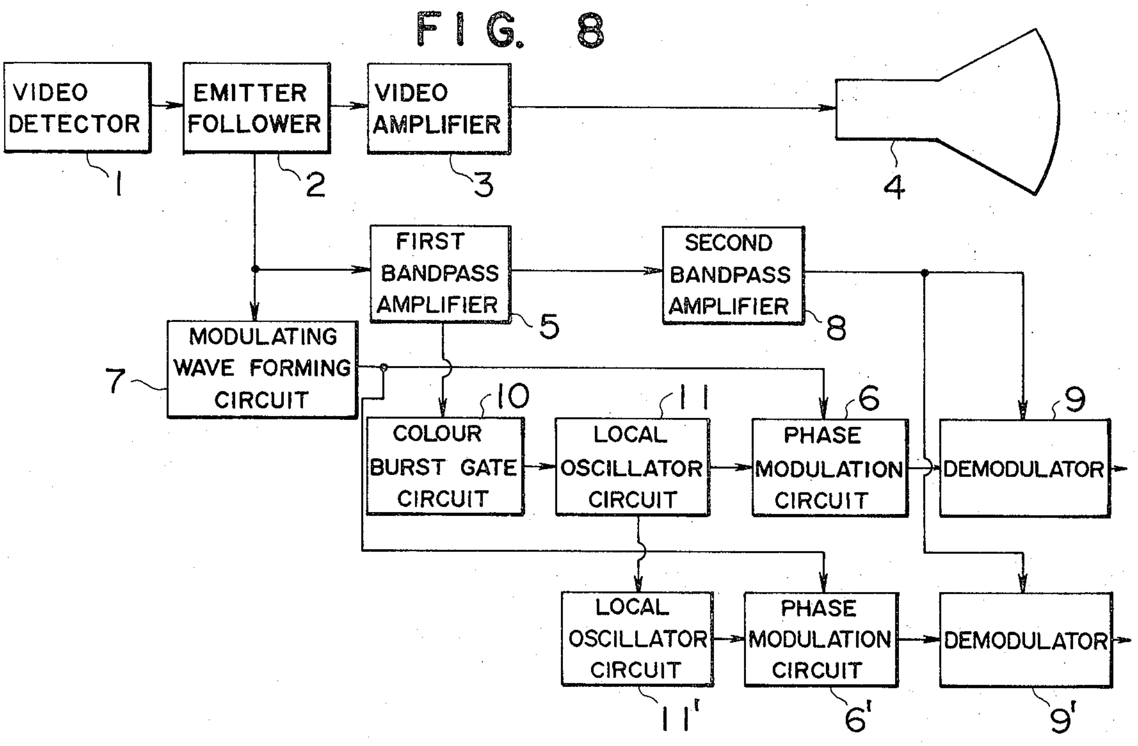
Figure 9:
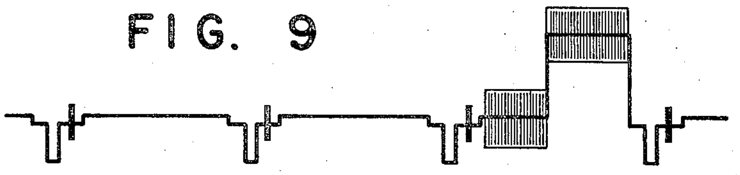
Figure 10:
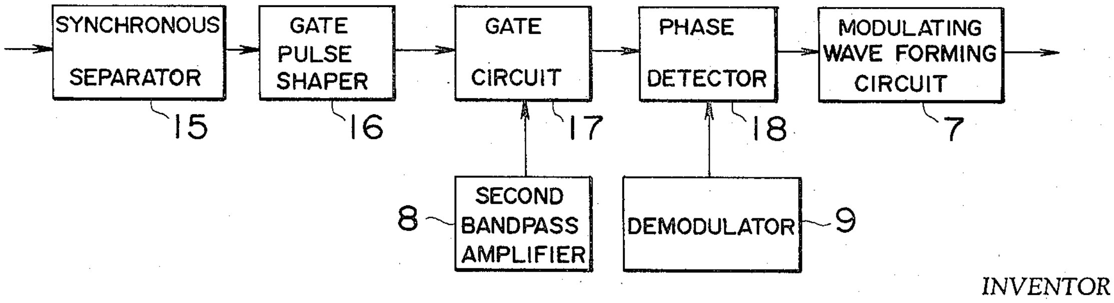

Above and other objects, features and advantages of the invention will become apparent as the description proceeds with reference to the drawings, wherein:

FIG. 1 is a vector diagram illustrating phase distortion occurring in a colour television signal according to PAL system, FIG. 2 is a vector diagram showing the phase and amplitude of a composite signal of two phase distorted signals, FIG. 3A shows a waveform of an exemplary video signal, FIG. 3B is a graph illustrating the magnitude of one possible differential phase distortion for the signal of FIG. 3A, FIG. 4 is a block diagram of a part of colour television receiver circuit incorporating the phase modulation circuit according to the invention, FIGS. 5A, 5B and 5C show waveforms for explaining an exemplary operation of the phase modulation circuit, FIGS. 6 and 7 are phasor diagrams showing the phase relationship of various colour signals shown in FIG. 5, FIG. 8 is a block diagram of another form of colour television receiver circuit incorporating the phase modulation circuit according to the invention, FIG. 9 shows a schematic waveform of a color television signal including a phase distortion detecting signal, and FIG. 10 is a block diagram of a control circuit for correcting the differential phase distortion by utilizing the color television signal of FIG. 9.

Referring to FIG. 4, the receiver circuit shown inlcudes a video detector 1 which is connected with an emitter follower 2 having a low output impedance. The emitter follower 2 supplies video signal to a video amplifier 3 which drives a picture tube 4. The emitter follower 2 also supplies video signal to a first bandpass amplifier 5 which is connected with a phase modulation circuit 6 provided in accordance with the invention for phase modulating the colour difference modulated colour subcarrier from the first bandpass amplifier 5. For this purpose, the emitter follower also supplies the video signal to a modulating wave forming circuit 7, the output of which is connected with the phase modulation circuit 6. The circuit 7 may be a conventional amplifier with filter characteristic to block chrominance components (compare FIG. 5A with FIG. 5C). The circuit 7 may also incorporate a switch for changing the polarity of the voltage supplied to the phase modulation circuit 6, the switch being changed over in a manner to restore the correct hue in the image. The output of the phase modulation circuit 6 is fed to a second bandpass amplifier 8 for deriving chrominance components at a low output impedance, and also to a colour burst gate circuit 10, which extracts a colour sync signal from the video signal supplied for controlling the synchronization of a local oscillator circuit 11. The local oscillator circuit 11 produces reference subcarrier voltages required for demodulation in a demodulator 9.

In order to explain the operation of the circuit shown in FIG. 4, assume now that the output of the emitter follower 2 has a stepped waveform such as is shown in FIG. 5A, the waveform including in a region of one horizontal line a colour sync signal *a* and three steps of different levels each superimposed with colour bar *b*, *c* or *d* of an equal amplitude and a phase corresponding to magenta (FIG. 5B). In the next horizontal line, the composite video signal shown includes colour sync signal *e* and colour bars of magenta *f*, *g* and *h*. It will be seen that the original phase relationship between these signal components will be shown in the phasor diagram of FIG. 6, assuming that the signal is formed according to the PAL system.

Thus, when the video signal shown is free from differential phase distortion, signal components *b*, *c* and *d* will be aligned on the phasor diagram, and signal components *f*, *g* and *h* will be symmetrical thereto with respect to B-Y axis. However, when the video signal has actually traversed various transmission lines, it may appear at the output of the first bandpass amplifier 5 with a phase relationship of signal components as depicted in FIG. 7. Taking the phase of colour sync signal as a reference, in the example shown, signal components *b* and *f* remain without substantial phase shift, while signal components *c* and *g* undergo a small amount of phase shift, and the amount of phase distortion occuuing in signal components *d* and *h* becomes the greatest. If the output were directly fed to the demodulator 9, these signal components when demodulated would have an increasing amount of reddish hue in the sequence of *b*, *c* and *d*.

The purpose of the circuit 7 is to form a waveform corresponding to the video signal supplied by the emitter follow 2 in which signal, the the colour sync signals *a*, *e* and colour bars *b*, *c*, *d*, *f*, *g* and *h* are removed. The wave from the circuit 7 is supplied to the conventional phase modulation circuit 6 to provide phase modulation of the colour difference modulated colour subcarrier (FIG. 5A) supplied thereto by the first bandpass amplifier 5 in an amount corresponding to the level of the respective steps thereon, thereby restoring the phase relationship shown in FIG. 6. In this manner, the invention enables a correct hue to be maintained.

The gain of the circuit 7 must be adjusted to take into account the degree of phase shift of the colour television signal, such phase shift varying as a function of the characteristics of the transmission line traversed by the colour television signal. However, the amount of phase distortion occurring on the transmitting and receiving ends can be predicted and will depend upon the equipment used. Providing a fixed gain for the circuit 7, determined on the basis of such estimate, may be adequate for the intended purpose. The gain of the circuit 7 can also automatically be controlled by applying a test signal in the vertical retrace period of a colour television signal supplied from of the broadcasting system, so as to permit determination of the amount of phase distortion within the receiver. This will be described hereinafter with reference to FIGS. 9 and 10.

Referring to FIG. 8, there is shown another embodiment of the invention wherein parts corresponding to those shown in FIG. 4 are designated by like numerals with or without prime. Here, phase modulation circuits 6 and 6′ are connected with the outputs of local oscillators 11 and 11′ which produce reference colour subcarriers for B-Y and R-Y axes, respectively, so as to phase modulate these references subcarriers in accordance with the level of the wave in a manner to that before described. It will be appreciated that since the hue is governed by the relative phase relationship of the chrominance signal and the reference subcarrier, this embodiment also provides correction of differential phase distortion in the similar manner as the previous embodiment in which the wave of FIG. 5C was used to phase modulate the chrominance signal. FIG.

FIG. 9 shows the positioning of a wafeform 0f a phase distortion detecting signal for effect during a vertical retrace as previously mentioned. When such a detecting signal is included in a colour television signal, the control circuit shown in FIG. 10 can be used to control the gain of the circuit 7. In this Figure, a synchronous separator 15 is connected with a gate pulse shaper 16 which forms a gate pulse of a vertical scanning frequency and coinciding in the position with the detecting signal. The gate pulse is fed to a gate 17 which extracts only the detecting signal from the chrominance signal supplied by the second bandpass amplifier 8. The detecting signal extracted is supplied to a phase detector 18 which is supplied with a reference signal from the reference subcarrier oscillator 9 to detect the amount of differential phase distortion. The output from the phase detector 18 controls the gain of the circuit 7.

While the invention has been described primarily with the PAL system, the invention is equally applicable to the NTSC system in substantially the same manner. When the invention is used with the PAL system, the effect will be very similar if the correction were effected for R-Y component alone, because the human eye is not so sensitive to phase distortion of B-Y component. Phase distortions occurring in the transmission system are not always linearly proportional to the amplitude of the video signal, but rather tend to be enhanced at greater amplitudes. Therefore, it should be noted that the circuit 7 of FIGS. 4 and 8 often are not constituted by a linear amplifier.

What is claimed is:

1. A differential phase distortion compensator for a colour television receiver comprising, detecting means for deriving from a composite colour television signal a video signal including a luminance signal, a chrominance signal and a colour sync signal, means for deriving a control voltage related exclusively to said luminance signal from said video signal, band pass amplifier means operatively connected to said detector means for deriving a signal corresponding to the chrominance component of said video signal and including said colour sync signal, colour burst means connected to said band pass amplifier means for deriving a signal corresponding to said colour sync signal, means connected to said colour burst means for producing a subcarrier, and phase modulation means connected to the output of said subcarrier producing means and to said control voltage deriving means for modulating the phase of the output of said subcarrier producing means with said control voltage in accordance with the luminance characteristics thereof.

2. A colour television receiver according to claim 1, in which the magnitude of said control voltage is substantially proportional to the magnitude of the luminance signal.

3. A colour television receiver according to claim 2, in which the magnitude of said voltage is proportional to an n-th power of the amplitude of the luminance signal, where $n$ is a positive integer.

4. A colour television receiver according to claim 1, wherein means is provided for automatically controlling the magnitude of the control voltage in accordance with the amount of differential phase distortion.

5. A colour television receiver according to claim 1, in which the magnitude of said voltage is proportional to an $n$-th power of the amplitude of the video signal, where $n$ is a positive integer.

6. A colour television receiver according to claim 1, in which said phase modulator means phase modulates that reference subcarrier that is used for demodulation of R-Y axis.

7. A colour television receiver according to claim 1, in which said colour television signal at the transmitter includes a signal located within a vertical retrace period, said signal being used for detecting said differential phase distortion, said receiver including means for detecting the magnitude of differential phase distortion as represented by said detecting signal and for automatically correcting differential phase distortion in accordance with the detected magnitude.

8. A colour television receiver according to claim 7, in which the magnitude of said voltage is automatically controlled in accordance with said detected magnitude.

* * * * *